(12) United States Patent
Dölker

(10) Patent No.: US 7,270,115 B2
(45) Date of Patent: Sep. 18, 2007

(54) METHOD FOR PRESSURE REGULATION OF AN ACCUMULATOR OF A FUEL INJECTION SYSTEM

(75) Inventor: Armin Dölker, Immenstaad (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 11/595,062

(22) Filed: Nov. 10, 2006

(65) Prior Publication Data

US 2007/0056561 A1    Mar. 15, 2007

Related U.S. Application Data

(63) Continuation-in-part of application No. PCT/EP2005/005017, filed on May 10, 2005.

(30) Foreign Application Priority Data

May 12, 2004   (DE)   ............ 10 2004 023 365

(51) Int. Cl.
*F02M 59/46* (2006.01)
(52) U.S. Cl. .............. 123/467; 123/447; 123/494
(58) Field of Classification Search ........ 123/467, 123/494, 357, 435, 419, 514, 456, 352, 447
See application file for complete search history.

(56) References Cited

U.S. PATENT DOCUMENTS

| | | | |
|---|---|---|---|
| 5,213,077 A * | 5/1993 | Nishizawa et al. ........ 123/352 |
| 5,609,136 A * | 3/1997 | Tuken ........................ 123/357 |
| 5,775,304 A * | 7/1998 | Kono et al. ................ 123/497 |
| 6,539,921 B1 * | 4/2003 | Matsumura ................ 123/456 |
| 6,840,222 B2 * | 1/2005 | Schilling et al. ........... 123/458 |
| 6,918,376 B2 * | 7/2005 | Oono et al. ................ 123/458 |

FOREIGN PATENT DOCUMENTS

| | | |
|---|---|---|
| DE | 197 31 995 | 1/1999 |
| DE | 102 45 268 A1 | 4/2004 |
| DE | 102 53 759 | 5/2004 |

* cited by examiner

Primary Examiner—Carl S. Miller
(74) Attorney, Agent, or Firm—Klaus J. Bach (57) ABSTRACT

In a method for the pressure regulation in a common rail fuel injection system of an internal combustion engine wherein pressurized fuel is supplied to the various combustion chambers of the engine via injectors under the control of an electronic control unit, a first actual control pressure is determined from a measured rail pressure and compared with a desired rail pressure in order to form a first control deviation, whereupon a volume flow depending on the first control deviation is determined and, from the measured rail pressure, a second actual rail pressure is determined using overridingly the second actual rail pressure for the calculation of the controller parts of the high pressure controller.

12 Claims, 7 Drawing Sheets

METHOD FOR PRESSURE REGULATION OF AN ACCUMULATOR OF A FUEL INJECTION SYSTEM

This is a Continuation-In-Part Application of International Application PCT/EP2005/005017 filed May 10, 2005 and claiming the priority of German application 10 2004 023365.4 filed May 12, 2004.

BACKGROUND OF THE INVENTION

The invention resides in a method for pressure regulation of an accumulator of a fuel injection system of an internal combustion engine wherein an actual rail pressure is determined via a filter from the measured rail pressure, a control deviation is calculated from the desired rail pressure and the actual rail pressure and a volume flow is determined via a high pressure controller as a control value depending on the control deviation.

In an accumulator fuel injection system, a high pressure fuel pump pumps fuel from a fuel tank into an accumulator rail. The fuel admission cross-section of the fuel supply line to the high pressure pump is controlled by a variable suction throttle. From the accumulator rail, the fuel is supplied to the combustion chambers of the internal combustion engine by way of fuel injectors mounted into the cylinder head of the engine. Since the quality of combustion depends greatly on the pressure level in the rail, the fuel pressure level in the rail is controlled via a high pressure control circuit. The high-pressure control circuit comprises a high pressure controller, the suction throttle with the high pressure pump and the rail as control path as well as a filter in a back-coupling branch. Typically, the high pressure controller is in the form of a PID controller or a PIDT1 controller, that is, it comprises at least one proportional part (P-part), an integral part (I part) and a differential part (D-part). In this high pressure control path, the pressure level in the rail corresponds to the control value. The pressure values measured in the rail are converted via the filter into an actual rail pressure and compared with a desired rail pressure. The control deviation obtained therefrom is converted by way of the high pressure controller into a control signal for the suction throttle. The control signal corresponds, for example to a volume flow with the unit liter/minute. The high-pressure control path described hereabove is known from the non-pre-published German patent application DE 103 30 466.5.

As protection from an excessively high pressure level, the rail is provided with a passive pressure limiting valve. When the pressure level becomes excessive, the pressure limiting valve opens whereby fuel is conducted from the rail back to the tank.

However, in practice, the following problem can occur: With a sudden load drop, the engine speed increases. An increase in the engine speed results, with a constant desired speed, in an increase in the speed control deviation. As a reaction, the speed controller will reduce the fuel injection amount as control value. A smaller fuel injection amount again causes a reduction of the fuel amount being removed from the rail so that the pressure level in the rail increases rapidly. An aggravating condition is that the pumping volume of the high pressure pump is speed-dependent: An increase in the engine speed results in an increased pumping volume and an additional pressure increase in the rail. Since the high pressure control has a relatively large reaction time, the rail pressure may increase to such a degree that the pressure limiting valve opens, for example, at 1950 bar. Then the rail pressure drops for example to a value of 800 bar. At this pressure level, an equilibrium state of the fuel amount pumped and the fuel returned to the tank is established. This means that, in spite of the opened pressure limiting valve, the rail pressure does not drop any further. The pressure limiting valve closes only, when the engine speed is reduced. Therefore, the unexpected opening of the pressure limiting valve as a result of a sudden load decrease is problematic.

It is the principal object of the present invention to improve the safety of the pressure control of an accumulator fuel injection system.

SUMMARY OF THE INVENTION

In a method for the pressure regulation in a common rail fuel injection system of an internal combustion engine wherein pressurized fuel is supplied to the various combustion chambers of the engine via injectors under the control of an electronic control unit, a first actual control pressure is determined from a measured rail pressure and compared with a desired rail pressure in order to form a first control deviation, whereupon a volume flow depending on the first control deviation is determined and, from the measured rail pressure, a second actual rail pressure is determined using overridingly the second actual rail pressure for the calculation of the controller parts of the high pressure controller.

The controller parts comprise the P part, the I part, the D part and the DT1 part. The second filter has herein a smaller time constant and a smaller phase delay than the first filter in the back coupling branch. The main purpose of the invention is consequently to increase the dynamics of the high pressure control circuit by the use of a second "fast" filter.

For shortening, the reaction time, in accordance with the present invention, a first proportional coefficient for determining the P-part and a first derivative action time for determining the D-part of the high pressure controller, each by way of a characteristic curve depending on the second actual rail pressure, are calculated. To this end, the characteristic curves includes a static and a dynamic range. In the dynamic range, an increasing proportional co-efficient or, respectively, an increasing derivative action time is assigned via the characteristic curves to an increasing second actual rail pressure.

In a particular embodiment of the invention, a second control deviation is calculated from the desired rail pressure and the second actual rail pressure and the P-part, the D-part and the DT1-part of the high pressure controller are determined depending on the second control deviation. The proportional coefficients for the P-part, the derivative action time for the D-part and the DT1-part are calculated by way of corresponding characteristic curves.

With the method according to the invention, an unexpected opening of the pressure limiting valve is safely prevented by an increase in the dynamics of the high-pressure control circuit. As a result, a continuous operation of the internal combustion engine is achieved even during significant load changes at the engine power take off, for example, during a generator load switch off or the emersion of a ship propeller drive.

The invention will become more readily apparent from the following description of a preferred embodiment thereof on the basis of the accompanying drawings.

DETAILED DESCRIPTION OF A PREFERRED EMBODIMENT

Figure 1:
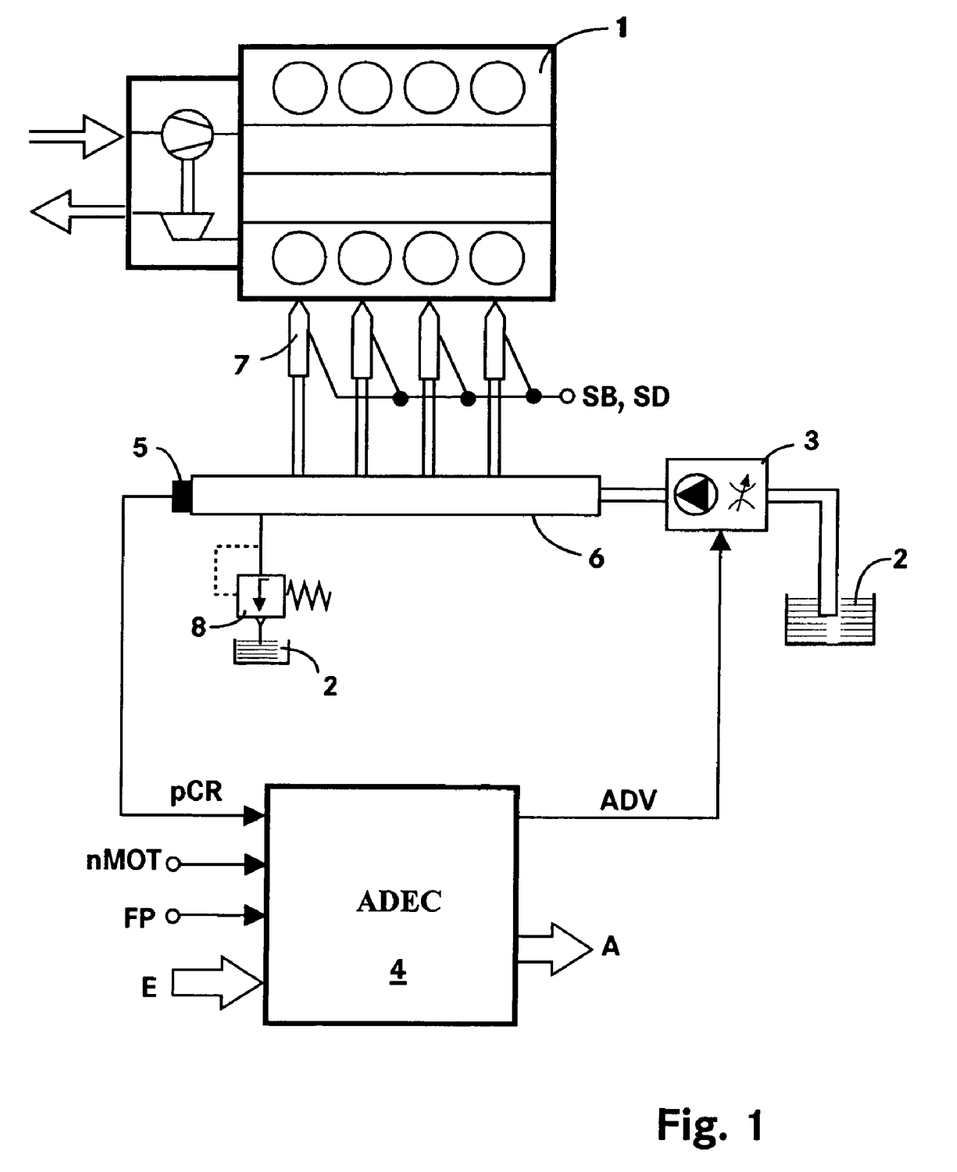
FIG. 1 shows the principal engine control system.

As shown in the engine control system presented in FIG. 1, fuel is supplied to the internal combustion engine 1 by way of a storage fuel injection system, that is, a so-called common rail fuel injection system. This system comprises the following components: a high-pressure pump 3 with a suction throttle for pumping the fuel from a fuel tank 2 to a rail 6 for storing the fuel and injectors 7 for injecting the fuel from the rail 6 into the combustion chambers of the internal combustion engine 1.

The operation of the engine is controlled by an electronic control apparatus (ADEC) 4. The electronic control apparatus 4 includes the usual components of a microcomputer system such as a microprocessor, I/O components, buffers and storage components (EE PROM, RAM). In the storage components, operation data relevant to the operation of the internal combustion engine 1 are stored in the form of performance graphs/characteristic curves, via which the electronic control unit 4 calculates the output values from the input values. FIG. 1 shows for example the following input values: a rail pressure pCR, which is measured by a rail pressure sensor 5, a speed signal nMOT of the internal combustion engine 1, a signal FP providing a desired engine power output by the operator and an input value E. The input value E represents for example the sum of the charge air pressure of a turbocharger and the temperatures of the coolant/lubricant and the fuel.

FIG. 1 shows as output values of the electronic control unit 4, a signal ADV for controlling the suction throttle and an output value A. The output value A represents additional control signals for controlling the internal combustion engine 1, for example, the injection begin SB and the injection duration SD. The signal ADC is in practice a pulse width-modulated signal (PWM).

Such a common rail fuel injection system is operated at a maximum stationary rail pressure of, for example, 1800 bar. For the protection of the system from an excessively high pressure level in the rail 6, a passive pressure limiting valve 8 is provided, which opens at a pressure level of for example, 1950 bar. When the pressure limiting valve 8 opens fuel is released from the common rail 6 and is returned via the pressure limiting valve 8 to the fuel tank 2. As a result, the pressure level in the rail 6 drops to a value of for example 800 bar.

Figure 2:
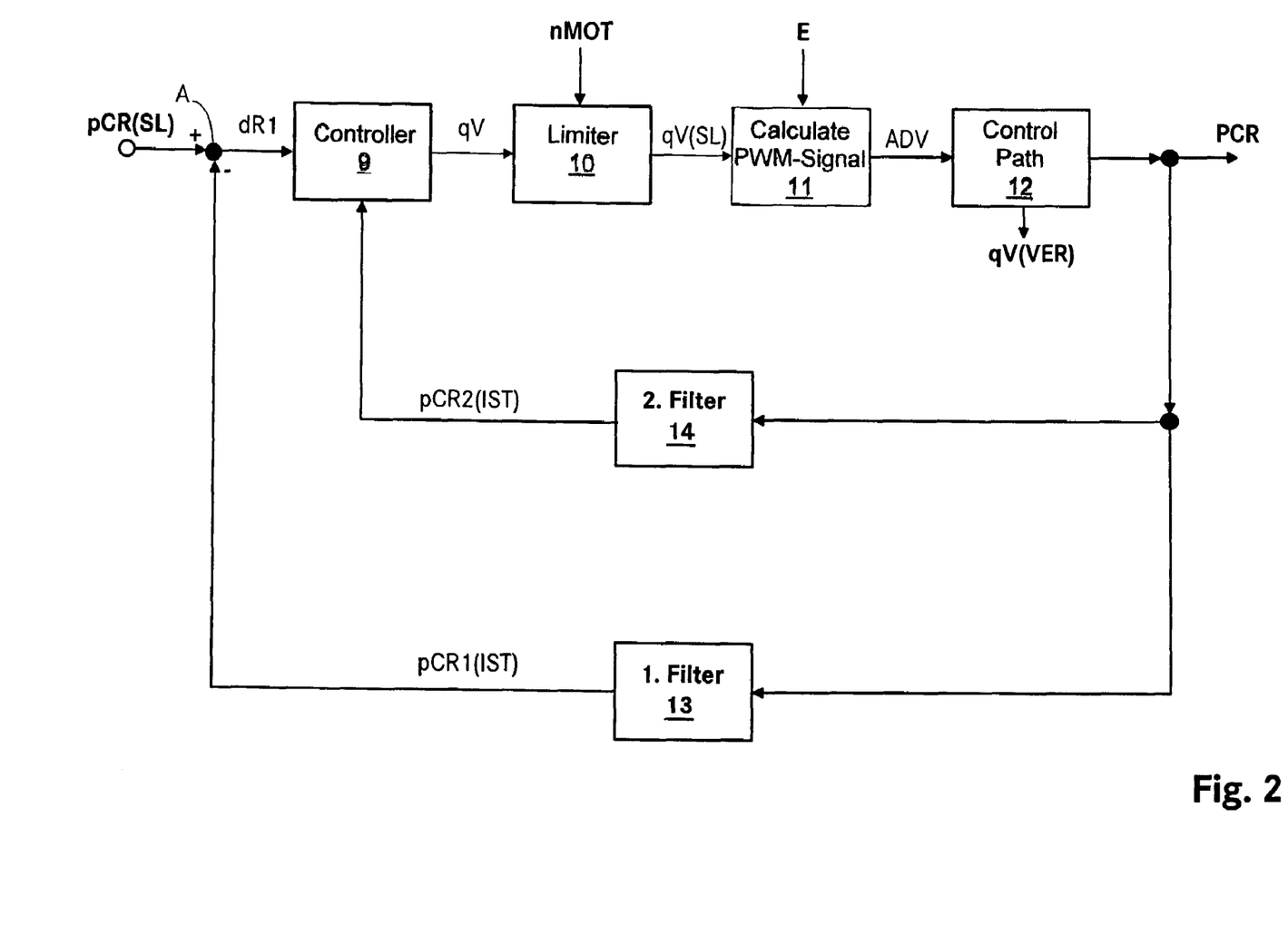
FIG. 2 shows a first embodiment of a high pressure control circuit.

FIG. 2 shows a high pressure control circuit for controlling the rail pressure pCR in a first embodiment. The input value represents the desired value of the rail pressure pCR (SL). The output value corresponds to the raw value of the rail pressure pCR. From the raw values of the rail pressure pCR, a first actual rail pressure pCR1(IST) is determined by way of a first filter 13. This value is compared at a summation point A with the desired value pCR(SL), whereby a first control deviation dR1 is obtained. From the first control deviation dR1, a control value is calculated by means of a high pressure controller 9. The control value corresponds to a volume flow qV. The physical unit of the volume flow may be for example liter/minute. Optionally, there may provisions for adding the calculated desired value to the volume flow qV. The volume flow qV represents the input value for a limit 10. The limit 10 can be speed-dependent, that is, dependent on the input value nMOT. The output value qV(SL) of the limit 10 is then converted in a function block 11 to a PWM signal. In the conversion, variations in the operating voltage and the fuel pre-pressure are taken into consideration by means of the input value E. The PWM signal ADV is then supplied to the magnetic coil of the suction throttle. In this way, the travel distance of the magnetic core is changed whereby the supply flow for the high-pressure pump 3 is affected. The high pressure pump 3 with the suction throttle and the rail 6 represent the control path 12. From the rail 6, a volume flow qV(VER) is discharged via the injectors 7. At this point, the control circuit is closed.

In accordance with the invention, a second actual rail pressure pCR2(IST) is calculated from the raw values of the rail pressure pCR by way of a second filter 14. The second filter 14 has a smaller time constant and therefore a smaller phase delay than the first filter 13. This means that the second actual rail pressure pCR2(IST) is less time-delayed than the first actual rail pressure pCR1(IST). The calculation of the controller parts of the high pressure controller 9 is mainly influenced by the second actual rail pressure pCR2 (IST). To this end, in the embodiment according to FIG. 2, the second actual rail pressure pCR2(IST) is directly applied to the high pressure controller 9.

Figure 3:
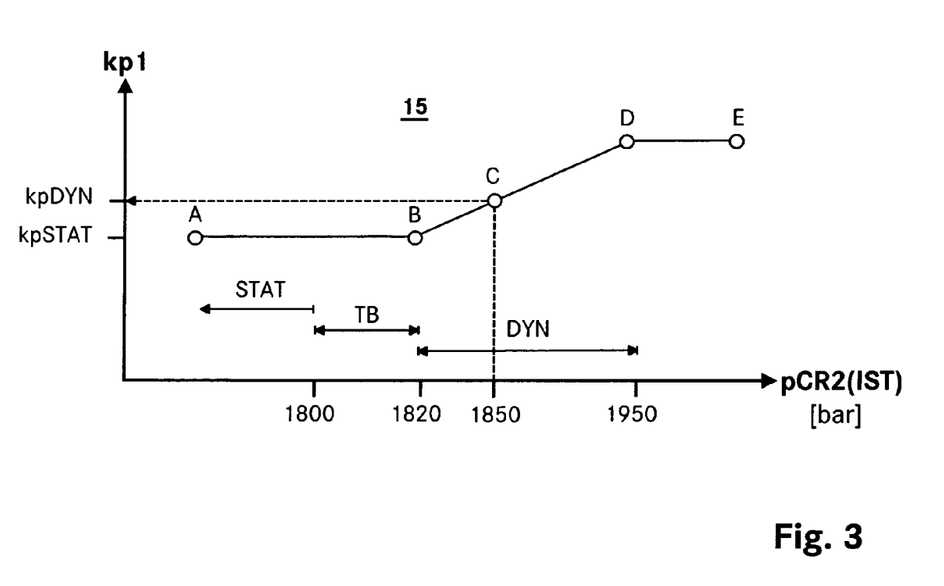
FIG. 3 shows a first characteristic line.

FIG. 3 shows a first characteristic curve 15 by way of which a first proportional coefficient kp1 for determining a P-part of the high pressure controller 9 is given. On the base, the second actual rail pressure pCR2(IST) is provided in bar. On the ordinate, as output value, the first proportional coefficient kp1 is given. The first characteristic curve 15 comprises a stationary range STAT and a dynamic range DYN. The stationary range STAT ends at a pressure value of 1800 bar. This corresponds to the maximum stationary rail pressure at full load. The dynamic range DYN begins at a pressure value of 1820 bar. For increasing the safety, a tolerance band TB is of, for example, 20 bar provided between the stationary and the dynamic range. The first characteristic curve 15 comprises a base-parallel section with the points AB, an upwardly inclined section with the points BCD and another base-parallel section with the points DE. If the internal combustion engine is operated for example at full load, a first proportional coefficient kp1 of kpSTAT is assigned to the second actual rail pressure pCR2(IST) of 1800 bar by way of the first characteristic line 15. If the second actual rail pressure pCR2(IST) becomes larger for example because of loss of a load, an increased first proportional coefficient kp1 of kpDYN, point C in the dynamic range is calculated by way of the first characteristic curve 15. An increased first proportional coefficient kp1 causes an increase of the P-part of the high pressure controller 9 and, consequently, a reduction in the control value, that is, a reduction in the throttle cross-section of the suction throttle.

Figure 4:
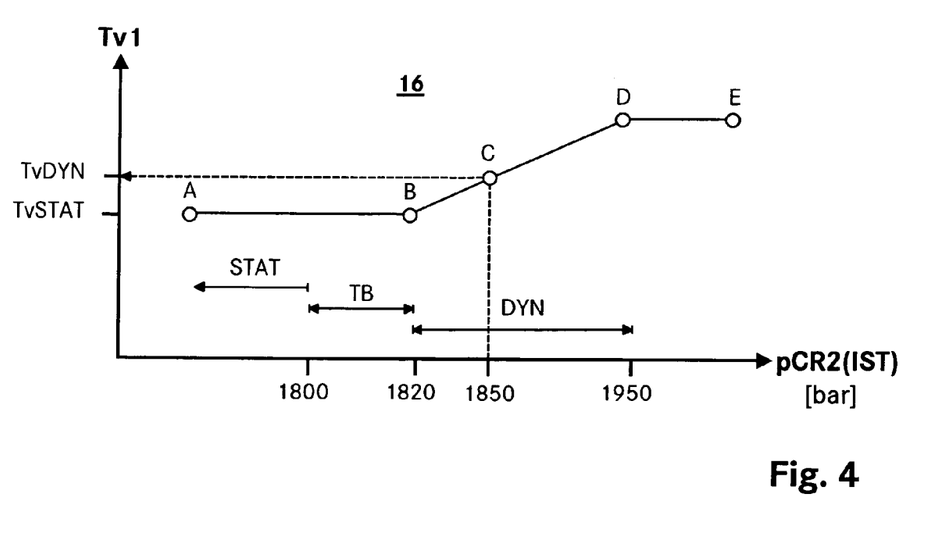
FIG. 4 shows a second characteristic line.

FIG. 4 shows a second characteristic curve 16 by which a first derivative action time Tv1 is assigned to the second actual rail pressure pCR2(IST). The second characteristic curve 16 corresponds in its course to the first characteristic curve 15. On the base, the second actual rail pressure p(CR2(IST) is indicated in bar. On the ordinate, the first derivative action time Tv1 is indicated as output value. The first characteristic curve 16 comprises a stationary range STAT and a dynamic range DYN. The stationary range ends at a pressure value of 1800 bar. This corresponds to the maximum stationary rail pressure at full load. The dynamic range DYN begins at a pressure value of 1820 bar. For increased safety, a tolerance band Turbocharger of 20 bar is provided between the stationary and the dynamic range. The second characteristic curve 16 comprises a base-parallel section with the points AB, an upwardly inclined section with the points BCD and another base parallel section with the points DE. If the internal combustion engine is operated for example under full load, a first derivative action time Tv1 of TvSTAT is assigned to the actual rail pressure pCR2(IST) of 1800 bar by way of the second characteristic curve 16. If the second actual rail pressure pCR2(IST) becomes larger, for example because of a load loss, an increased first derivative action time Tv1 of TVDYN is calculated in the dynamic range DYN by way of the second characteristic curve 16. An increased first derivative action time Tv1 results in an increase of the D-part of the high pressure controller 9 and, consequently, in a reduction of the control valve or, respectively, a reduction of the throttling cross-section of the suction throttle.

Figure 5:
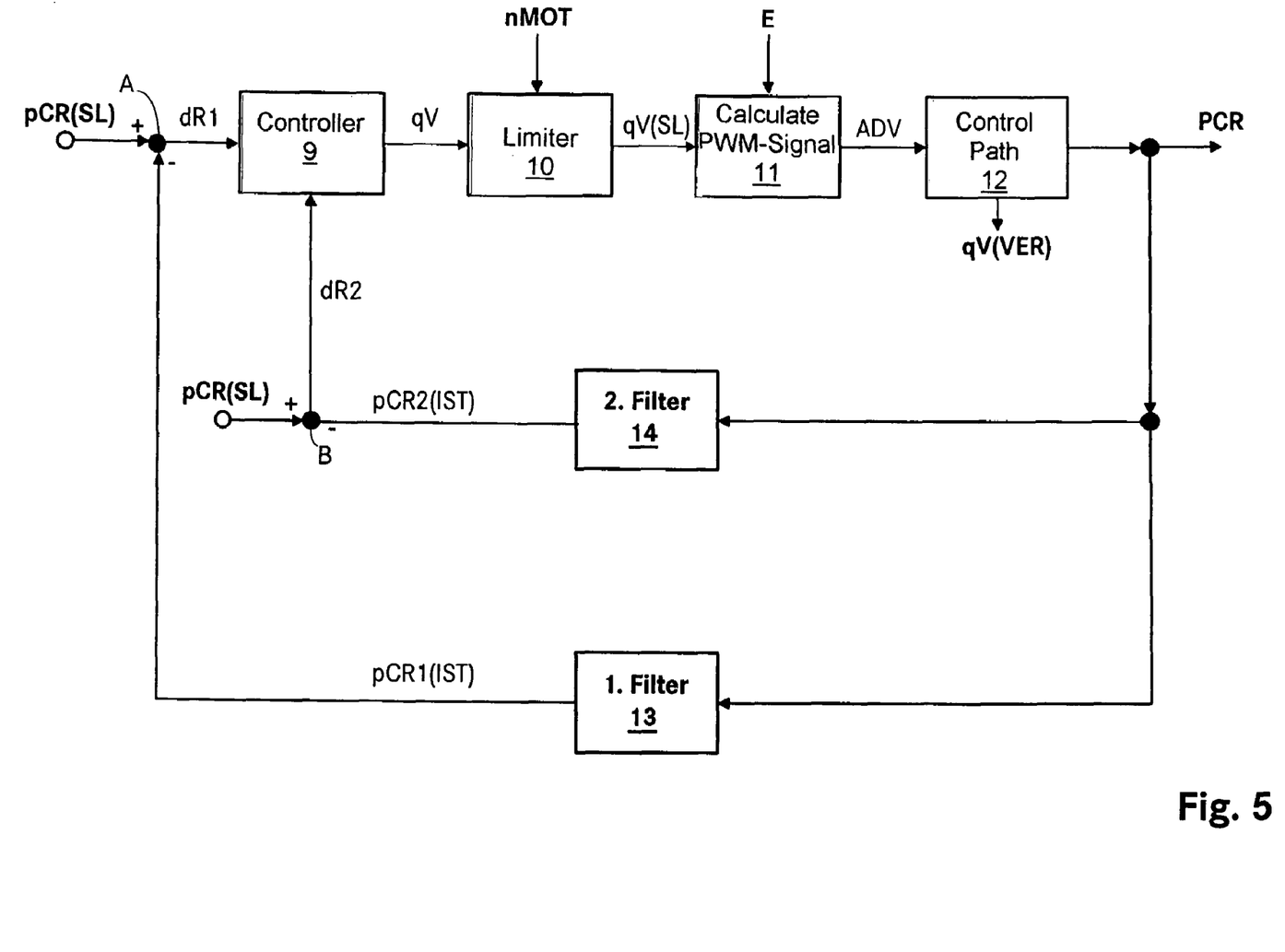
FIG. 5 shows a second embodiment of a high pressure control circuit.

FIG. 5 shows a second embodiment of a high-pressure control circuit for controlling the rail pressure pCR. This embodiment differs from that according to FIG. 2, in that the output value of the second filter 14, here the second actual rail pressure pCR2(IST), is subtracted at a summation point B from the desired rail pressure pCR(SL). The result corresponds to a second control deviation dR2, which is supplied to the high pressure controller 9. In this embodiment, the P-, D- and DT1-part of the high pressure controller 9 is determined mainly by the second actual rail pressure pCR2(iST) via the second control deviation dR2. FIGS. 6-9 correspond hereto.

Figure 6:
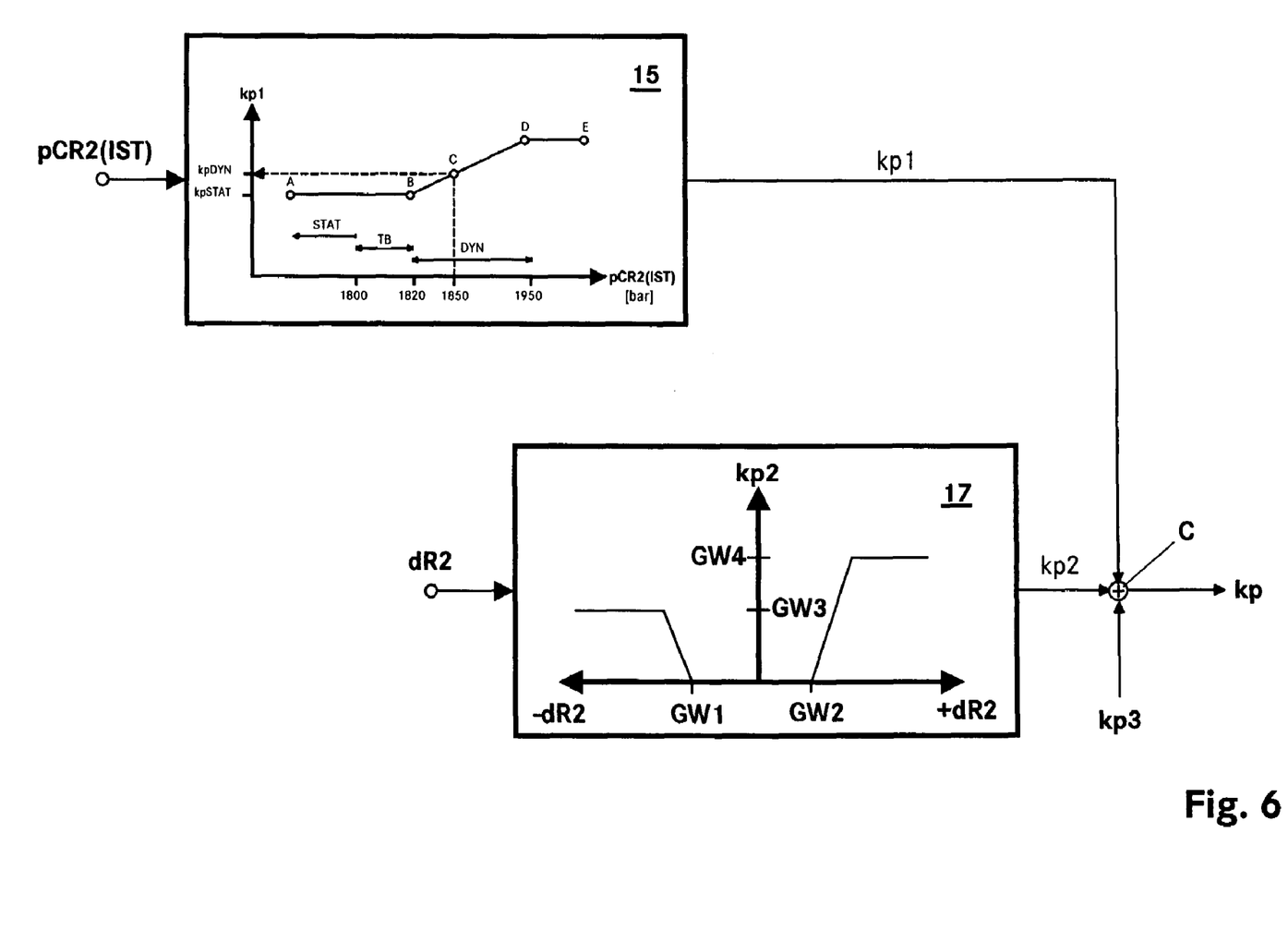
FIG. 6 shows a block diagram, proportional coefficient.

FIG. 6 shows a block diagram for calculating a proportional coefficient kp. FIG. 6 comprises as essential elements the first characteristic curve 15 for calculating the first proportional coefficient kp1 and a third characteristic curve 17 for calculating a second proportional coefficient kp2. The proportional coefficient kp1 is calculated according to the description of FIG. 3. The input value of the third characteristic curve 17 corresponds to the second control deviation dR2. The output value corresponds to the second proportional coefficient kp2. On the base of the third characteristic curve 17 values of the second control deviation dR2 are plotted in positive/negative direction. The ordinate corresponds to the second proportional coefficient kp2. On the base, a first limit value GW1 and a second limit value GW2 are indicated. With very high negative values of the second control deviation dR2kp2 is limited to a value GW3. A negative control deviation occurs when the second actual rail pressure pCR2(iST) is greater than the desired rail pressure pCR(SL)> with large positive second control deviations dR2, the second proportional coefficient kp2 is limited to the value GW4. In the range between the first limit value GW1 and the second limit value GW2, the GW2, the second proportional coefficient kp2 is given the value zero. From the third characteristic curve 17, it is apparent that in a stationary state, that is, when the second control deviation dR2 is almost zero, the second proportional coefficient kp2 has the value zero.

Figure 7:
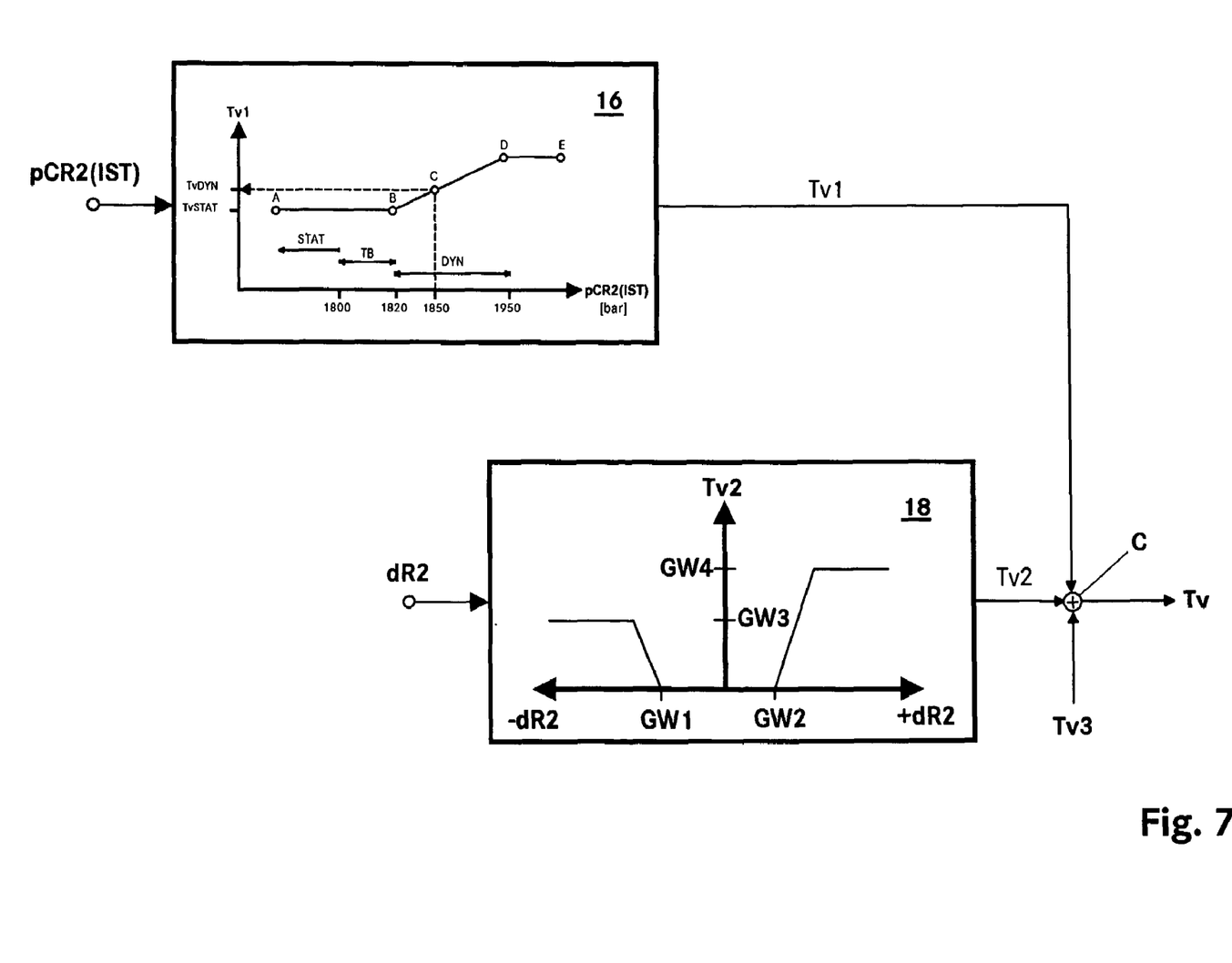
FIG. 7 shows a block diagram, derivative action time.

At a summation location C, the first derivative action time Tv1, the second derivative action time Tv2 and a third derivative action time Tv3 are added. The third derivative action time Tv3 may herein either be constant or it may be calculated depending on a desired torque or depending on the engine speed nMOT. The result corresponds to the output value Tv.

Figure 8:
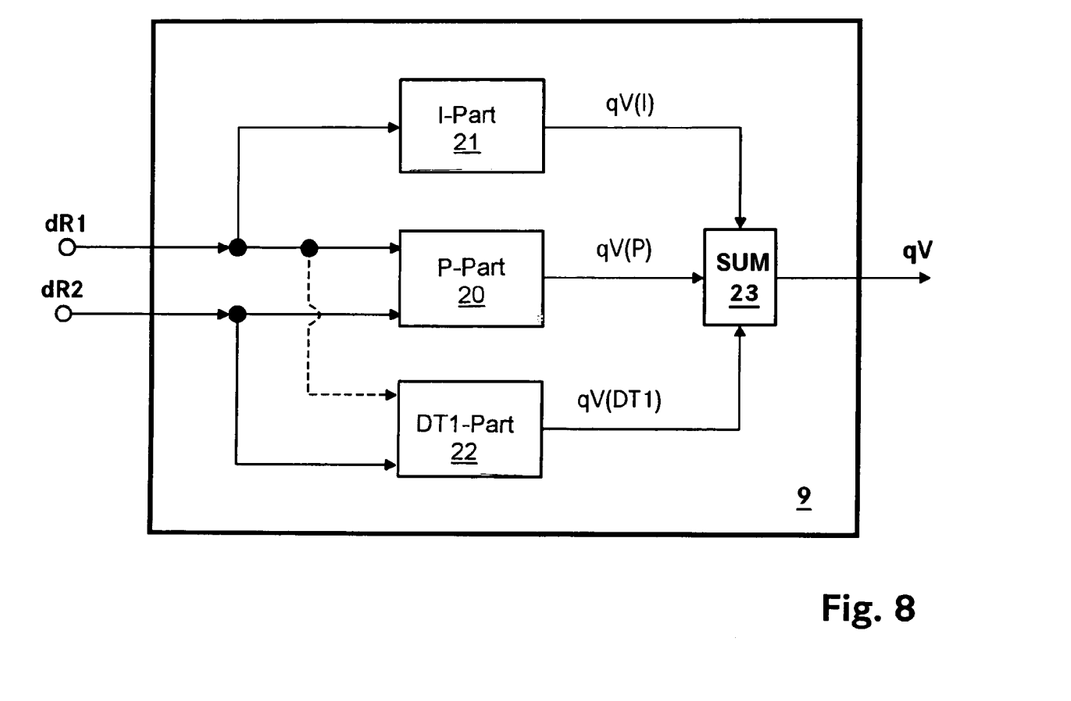
FIG. 8 shows a block diagram, volume flow.
Figure 9:
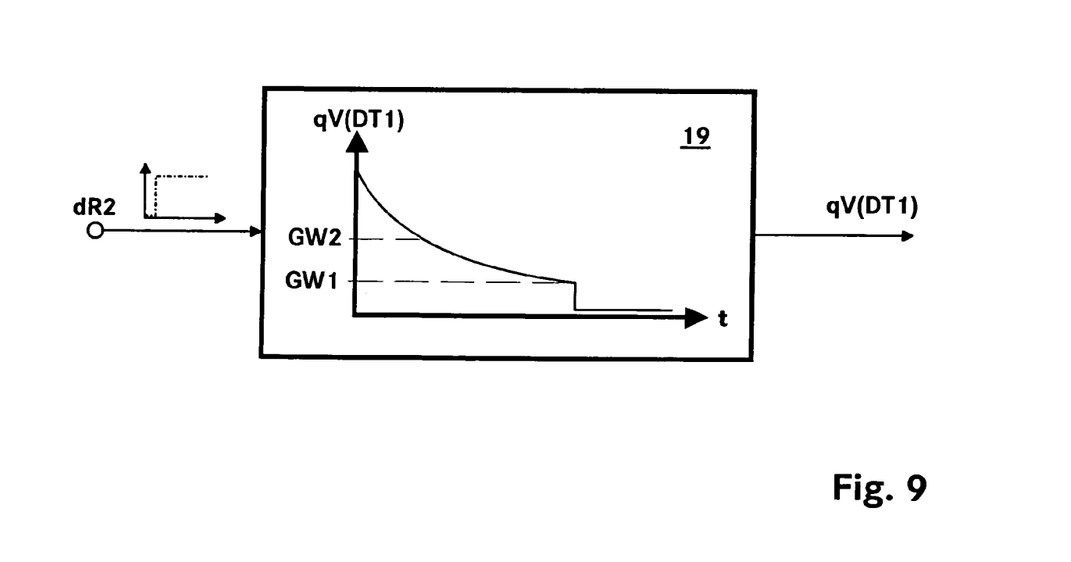
FIG. 9 shows a block diagram, DT1-part.

FIG. 8 shows a block diagram for calculating the volume flow qV, that is, the control value of the high pressure controller 9. The figure shows the inner structure of the high pressure controller 9, which includes three function blocks for calculating the controller parts. Those are a P-part 20, an I-part 21 and a DT1 part 22. By way of the P-part 20, depending on the first control deviation dR1 and the second control deviation dR2, a proportional part qV(P) of the volume flow qV is calculated. By way of the I-part 21, depending on the first controller deviation dR1, an integrating part aV(I) of the volume flow qV is calculated. The DT1-part qV(DT1) of the volume flow is calculated by way of the DT1 part 22. By a summation 23, the volume flow qV is determined from the summands of the P-, I- and DT1-parts. For calculating the DT1 parts, there are two ways. In the first way, the second control deviation dR2 is used only for calculating the derivative action time Tv in accordance with FIG. 7. The input value of the DT1 algorithm is then the first control deviation dR1. In the second way, also the input value of the DT1 algorithm is determined from the second control deviation. FIG. 9 shows herefor a diagram 19 of the DT1 part qV(DT1) with a jump-like change of the input value dR2. The base indicates the time t. The ordinate indicates the DT1 part qV(DT1). In the diagram, the limit values GW1 and GW2 are marked. The DT1 part is deactivated, wherein the second control deviation dR2 becomes smaller than the first limit value GW1, that is, the signal qV(DT1) then has the value zero. The DT1 part is activated when the second control deviation dR2 becomes larger than the second limit value GW2. By way of the limit value GW2, it is achieved that, with dynamic condition changes, that is a large positive or negative second control deviation dR2, the DT1 part enters the calculation of the volume flow qV. Under stationary conditions, that is, when the second control deviation dR2 is almost zero, the volume flow qV is determined exclusively from the P-part 20 and the I-part 21.

What is claimed is:

1. A method for the pressure regulation of an accumulator fuel injection system for an internal combustion engine (1) having a common rail from which pressurized fuel is supplied to the various combustion chambers of the engine via fuel injectors under the control of an electronic control unit, said method comprising the steps of:

determining a first actual rail pressure (pCR1(IST)) from a measured rail pressure (pCR) via a first filter (13), calculating from a desired rail pressure (pCR(SL)) and the first actual rail pressure (pCR1(IST)) a first control deviation (dR1), determining, by a high pressure controller (9), a volume flow (qV) depending on the first control deviation (dR1), determining from the measured rail pressure (pCR) a second actual rail pressure (pCR2(IST)) via a second filter (14), and using overridingly the second actual rail pressure (pCR2(IST)) for the calculation of the control contribution of the high pressure controller (9) by calculating a first proportional coefficient (kp1) for determining a P-component (20) of the high pressure controller (9) via a first characteristic line (15) depending on the second actual rail pressure (pCR2(IST)) and calculating supplementally a delayed action time (TV1) for determining a D-component and a DT1 component (22) of the high pressure controller (9) via a second characteristic line (16) depending on the second actual rail pressure (pCR2(IST)), wherein the first characteristic line (15)

and the second characteristic line (16) have a stationary range (STAT) in which, independently of the value of the second actual rail pressure (pCR2(IST)) a constant first proportional coefficient (kp1) and a constant first action delay time (Tv1) are calculated and in the dynamic range (DYN) the first proportional coefficient (kp1) and the action delay time (Tv1) are calculated based on an ascending function.

2. A method according to claim 1, wherein a second control deviation (dR2) is calculated from the desired rail pressure (pCR(SL)) and the second actual rail pressure (pCR2(IST)) and the P-part (20), the D-part and the DT1-part (22) of the high pressure controller (9) are determined depending on the second control deviation (dR2).

3. A method according to claim 2, wherein a proportional coefficient (kp) for the determination of the P-part of the high pressure controller (9) is calculated from the sum of the first (kp1), a second (kp2) and a third proportional coefficient (kp3).

4. A method according to claim 3, wherein the second proportional coefficient (kp2) is calculated depending on the second control deviation (dR2) via a third characteristic curve (17).

5. A method according to claim 3, wherein the third proportional coefficient (kp3) is constant (kp3=const).

6. A method according to claim 3, wherein the third proportional coefficient (kp3) is calculated depending on one of a desired torque and an engine speed.

7. A method according to claim 2, wherein a action delay time (Tv) for the determination of the D-part of the high pressure controller (9) is calculated from the sum of the first, a second and a third derivative action time.

8. A method according to claim 7, wherein the second action delay time (Tv2) is calculated depending on the second control deviation (dR2) via a fourth characteristic curve (18).

9. A method according to claim 7, wherein the third action delay time (Tv3) is constant.

10. A method according to claim 7, wherein the third action delay time is calculated depending on one of a desired torque and an engine speed.

11. A method according to claim 2, wherein the DT1-part (22) of the high pressure controller (9) is switched on above a second limit value (GW2) and is switched off below a first limit value (GW1).

12. A method according to claim 1, wherein the second filter (14) has a smaller time constant and a smaller phase delay than the first filter (13).

* * * * *